United States Patent [19]

Briscoe et al.

[11] Patent Number: 4,807,515
[45] Date of Patent: Feb. 28, 1989

[54] METHOD AND APPARATUS FOR DEICING A LEADING EDGE

[75] Inventors: James A. Briscoe; James C. Putt, both of Doylestown; Ronald W. Phillips, II, Mogadore, all of Ohio

[73] Assignee: The B. F. Goodrich Company, Akron, Ohio

[21] Appl. No.: 33,566

[22] Filed: Apr. 3, 1987

Related U.S. Application Data

[62] Division of Ser. No. 822,972, Jan. 27, 1986, Pat. No. 4,706,911.

[51] Int. Cl.$^4$ .............................................. F04B 17/00
[52] U.S. Cl. ...................................... 91/346; 91/321; 417/401
[58] Field of Search .................. 417/401; 91/321, 341, 91/346

[56] References Cited

U.S. PATENT DOCUMENTS 2,804,055  8/1957  Hill et al. ........................... 91/346 X
4,042,311  8/1977  Yonezawa ........................... 417/401

FOREIGN PATENT DOCUMENTS 1813145  2/1970  Fed. Rep. of Germany ...... 417/401

Primary Examiner—Arnold Rosenthal
Attorney, Agent, or Firm—W. W. Ban; D. M. Ronyak

[57]   ABSTRACT

An airfoil deicer and method for deicing an airfoil wherein the deicer has an outer skin having an elevated modulus of elasticity and a means for introducing a small deflection into the outer skin thereby creating substantial chord-wise tension in the outer skin, the deflection being induced in less than 0.250 seconds. In the method of deicing, the deflection is induced periodically and being completed within a time span of about 0.250 seconds to remove accumulations of ice as thin as 0.06 centimeters.

2 Claims, 5 Drawing Sheets

METHOD AND APPARATUS FOR DEICING A LEADING EDGE

This is a division of application Ser. No. 822,972, filed Jan. 27, 1986, now U.S. Pat. No. 4,706,911, issued Nov. 17, 1987.

FIELD OF THE INVENTION

This invention relates to methods and apparatus for deicing leading edges. More particularly, this invention pertains to the deicing of aircraft leading edge surfaces such as on wings, struts, stabilizers, and propellers. Specifically, this invention relates to pneumatically actuated deicers for use on leading edges.

BACKGROUND OF THE INVENTION

Since the early days of powered aviation, aircraft have been, from time to time, troubled by accumulations of ice on component surfaces of the aircraft such as wings and struts, under certain flight conditions. Unchecked, such accumulations can eventually so laden the aircraft with additional weight and so alter the airfoil configuration of the wings as to precipitate an unflyable condition. A search for means to combat the accumulation of ice under flying conditions has been a continuing one and has resulted in three generally universal approaches to removing accumulated ice, a process known generically as deicing.

In one form of deicing, leading edges, that is edges of the aircraft component on which ice accretes and is impinged upon by the air flowing over the aircraft and having a point at which this airflow stagnates, are heated to loosen adhesive forces between accumulating ice and the aircraft component. Once loosened, this ice is generally blown from the aircraft component by the airstream passing over the aircraft. Two methods of heating leading edges have enjoyed significant popularity. In one approach a heating element is placed in the leading edge zone of the aircraft component either by inclusion in a rubber boot applied over the leading edge or by incorporation into the skin structure of the aircraft component. This heating element, typically powered by electrical energy derived from a generating source driven by one or more of the aircraft engines, is switched on and off to provide heat sufficient to loosen accumulating ice. In very small aircraft powered typically by one or two engines, a sufficient quantity of electrical power may be unavailable for the use of electrical deicing.

In the other heating approach, gasses at elevated temperature from one or more compression stages of a turbine engine are circulated through leading edges of components such as wings and struts in order to effect a thermal deicing or anti-icing. Employed in aircraft powered by turbine engines, the use of these so-called compressor bleeds or by-pass streams from the aircraft engine turbine can result in reduced fuel economy and a lower turbine power output.

In limited situations a chemical is applied to all or part of the aircraft to depress adhesion of ice to the aircraft or to depress the freezing point of water collecting upon surfaces of the aircraft.

The remaining commonly employed method for deicing is typically termed mechanical deicing. In the principal commercial mechanical deicing means, pneumatic deicing, the leading edge zone of a wing or strut component of an aircraft is covered with a plurality of expandable, generally tube-like structures inflatable employing a pressurized fluid, typically air. Upon inflation, the tubular structures tend to expand the leading edge profile of the wing or strut and crack ice accumulating thereon for dispersal into the airstream passing over the aircraft component. Typically, such tube like structures have been configured to extend substantially parallel to the leading edge of the aircraft component. For airfoils such as wings and stabilizers, these structures may extend the entire span of the airfoil. A plurality of tube-like structures frequently are positioned on a wing or strut and typically are configured to be parallel to the leading edge of the wing or strut as by placement in a chord-wise succession away from the leading edge. The plurality of tubes can provide an ice removal function to the entire leading edge profile of the airfoil or strut.

Conventionally, pneumatic deicers are formed from a compound having rubbery or substantially elastic properties. Typically, the material forming tubes on such deicer structures can expand or stretch by 40% or more during inflation cycles causing a substantial change in the profile of the deicer (as well as the leading edge) and thereby cracking ice accumulating on the leading edge. At least in part because of the large volume of air required for inflating such highly expandable tubes, the times for inflating such tubes have typically historically averaged between 2 and about 6 seconds.

The rubber or rubber like materials forming these conventional pneumatic deicers typically are possessed of a modulus of elasticity of approximately 6900 kPa. Ice, as is well known, is possessed of an elastic modulus enabling typical ice accumulations to adjust to minor changes in contours of surfaces supporting such ice accumulations. The modulus of elasticity for ice is variously reported as being between about 275,000 kPa and about 3,450,000 kPa. The modulus of elasticity of rubber compounds used in conventional deicers however is substantially different from the modulus of elasticity typically associated with ice accumulations, and the large expansion undergone by the deicer during inflation functions to crack or rupture the structure of the ice accumulations thereon allowing such accumulations to be swept away by impinging wing streams.

Ice accumulations, in conforming to minor alterations in the contours of surfaces supporting the ice accumulations do so only somewhat slowly. The phenomenon by which ice accumulations conform to changing contours of support surfaces in some ways resembles the phenomenon of cold flow in thermoplastic materials. Where the ice accumulations are exposed to extremely rapid but minor deformations, an ice coating cannot accommodate such contour changes sufficiently rapidly and shatters as though struck with a hammer. More recently, it has been discovered that a subjecting leading edges of a wing or a stabilizer to electromechanical hammering, such as is shown by U.S. Pat. No. 3,549,964, can assist in removing accumulations of ice on the leading edge. Concern respecting the susceptibility of such leading edges to stress fatigue upon being hammered over extended periods of time as yet have functioned to preclude substantial commercial development of such electromechanical hammering schemes.

A means for deicing a leading edge not requiring the application of electrothermal deicers and not requiring the application of pneumatic deicers which, during the inflated state, substantially distort the leading edge profile for an extended period of time thereby interfering with the efficient performance of the leading edge could find substantial application in industry. Additionally, where such means for deicing a leading edge do not pose a significant likelihood for long term structural damage due to stress such as is associated with electromechanical hammering, such deicing means could find substantial commercial utility.

SUMMARY OF THE INVENTION

The present invention provides a method for deicing an ice accreting surface and particularly a leading edge surface. In the method, the surface of a substantially high-modulus material accumulates ice. According to the method, beneath this outer surface a distortion means is provided of a size, position and physical configuration suitable for distorting the outer surface and placing a chord-wise strain upon substantial portions of the outer surface upon activation. The distorting means is periodically activated to an extent sufficient to produce periodic desirable distortion and chord-wise strain in the outer surface sufficient to release accumulations or accretions of ice thereon with the activation being accomplished to the sufficient extent in not more than about 0.25 seconds, more preferably in less than about 0.10 seconds and most preferably not more than 0.05 seconds. Preferably, the distortion means is an inflatable means and preferably an inflatable means activatible employing a fluid under pressure, preferably a compressed gas such as air. However, other distortion means can be employed in the practice of the method of the invention, such as mechanical lifters configured to distort the outer surface by pressing or warping the outer surface away from a resting profile of the surface.

Preferably, the distortion is induced in the outer surface in a quite short time period, typically a hundred milliseconds or less and most preferably in less than about 50 milliseconds. The distortion induced preferably does not exceed about 0.5 centimeters and preferably not more than about 0.25 centimeters.

In accordance with the invention an apparatus for deicing an ice accreting surface such as a leading edge surface typically includes an outer surface formed of a material having a substantially elevated modulus of elasticity upon which ice accumulates. Preferably this elasticity modulus is at least 275,000 kPa and most preferably is at least as great as the modulus of elasticity characterizing ice accumulating upon the deicer surface.

The apparatus includes at least one distortion means of a size, position, and physical configuration whereby activation of the distortion means distorts the outer surface of the deicer placing a chord-wise strain upon substantial portions of the outer surface. Preferably this distortion means is an inflatable tubular member positioned beneath the outer surface and activated employing a fluid under pressure. Preferably this fluid is a compressed gaseous material.

The apparatus includes a means for triggering activation of the distortion means to effectuate distortion of the outer surface. When configured for use with an inflation means, this activation means including a means for inflating the inflatable member within not more than about 0.25 seconds, preferably not more than about 100 milliseconds, and most preferably not more than about 50 milliseconds. Where such distortion means is an inflatable member typically, the apparatus includes a means for deflating the distortion means following inflation.

In preferred embodiments, where the distortion means is inflatable, the apparatus according to the instant invention includes a means for assuring against inflating the inflatable tubular member to an extent in excess of that necessary for providing desirable deformation and chord-wise strain in the outer surface. Such an over-inflation protection means for gaseous fluids typically includes a accumulator in fluid communication with a source of gaseous fluid under pressure, the accumulator being of a particular size whereby release of a gaseous accumulation from the accumulator into the tubular member inflates the tubular member to a desired extent. Typically the inflation means by which an inflatable member is caused to inflate is a solenoid operated pilot valve, and preferably the accumulator is incorporated into the structure of such an inflation means.

Compressed gas for use in the practice of preferred embodiments of the instant invention can be obtained from a low pressure gas source such as a compressor stage on an aircraft engine turbine through use of an intensifier. Such an intensifier typically includes two piston surfaces with one such piston surface being of a smaller area than the other. Means are provided to expose the smaller piston area to the low pressure gas source whereby a cavity associated with the larger piston area is evacuated by travel of the piston. A poppet is provided with an indexing means whereby upon evacuation of the large piston air chamber, the low pressure gas source is applied to the large piston chamber and the piston is caused to reverse and compress gas occupying a chamber associated with the smaller piston area. When a desired extent of compression is achieved, the poppet is again shifted whereby the large piston chamber can again be evacuated, and low pressure gas is again applied to the small piston chamber.

The above and other features and advantages of the instant invention will become more apparent when viewed in light of the description of the best embodiment of the invention and the drawings which follow, together forming a part of the specification.

BEST EMBODIMENT OF THE INVENTION

The present invention provides a method and apparatus for deicing a leading edge. By deicing what is meant is the removal of ice subsequent to formation of the ice upon the leading edge. By leading edge what is meant is that portion of a surface of a structure which functions to meet and in substantial measure break, an airstream impinging upon the structure. Examples of leading edges would be forward edge portions of wings, stabilizers, struts, nacelles, and other housings and protrusions first impacted by an airstream flowing over an aircraft in flight.

Figure 1:
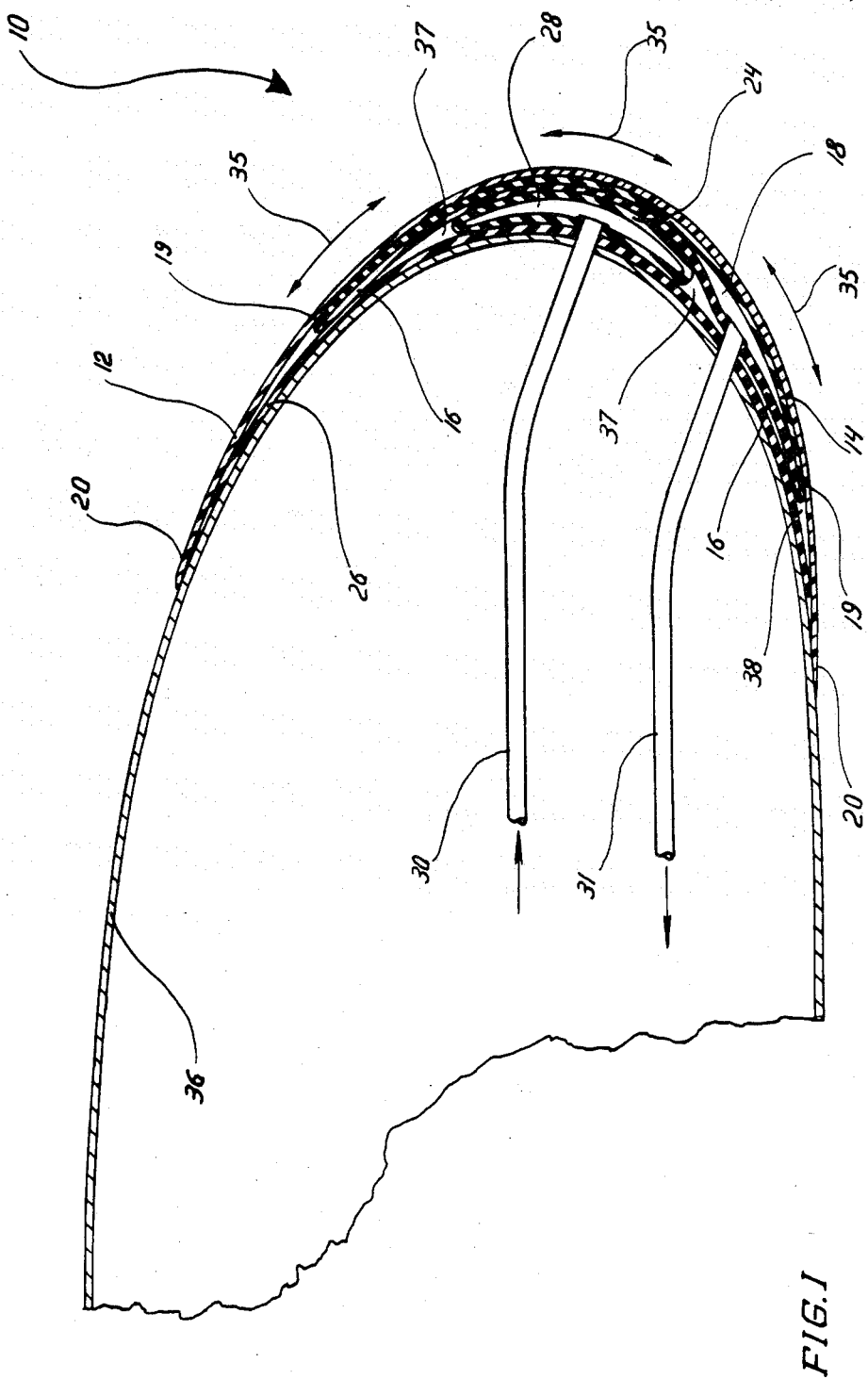
FIG. 1 is a side view in cross section of a deicer structure made in accordance with the instant invention.

Referring to the drawings, FIG. 1 depicts a leading edge deicer 10 in accordance with the invention.

The deicer 10 includes an outer surface layer 12 or skin formed of a rigid material such as a plastic or metal having a substantially elevated modulus of elasticity or so-called Young's modulus. This modulus of elasticity should be at least 40,000 kPa Preferably the modulus of elasticity is at least as great as the modulus of elasticity associated with ice accumulating upon the leading edge and preferably this modulus of elasticity is at least 275,000 kPa. In most preferred embodiments it is believed that this modulus of elasticity may be up to about 7,500,000 kPa or greater.

An upper intermediate ply 14 and a lower intermediate ply 16 are positioned beneath the skin 12. These plies 14, 16 are typically a fabric material coated on one surface with a rubberizing compound. In the upper intermediate ply 14, the rubberizing coating faces in a direction outwardly towards the skin 12 and is bonded to the skin 12. In the lower intermediate ply 16, the rubberizing compound faces in a direction inwardly away from the skin 12 whereby the fabric of the intermediate plies 14, 16 co-operate to define an interstitial space 18 between the plies 14, 16.

The fabric employed in the intermediate plies 14, 16 may be of any suitable or conventional nature. Preferably, a rayon, polyester, nylon or acrylic fiber based fabric is employed. The rubberizing compound can be of any suitable or conventional nature such as natural rubber, styrene butadiene or chloroprene rubbers suitable for bonding to the outer skin 12 or to other structural components of the deicer 10. Appropriate rubber compounds are well known in the rubber compounding field.

The plies 14, 16 are joined by mechanical attachment such as heat sealing, chemical bonding, adhesives, or, as shown in the drawing, by stitching 19 at least one trailing edge 20 of the deicer.

An inflatable member 24 and a bonding ply 26 are affixed to the lower ply 16 by adhesion, vulcanized bonding to the rubberizing compound of the lower intermediate ply 16 or other suitable or conventional means. The bonding ply 26 typically is configured of a rubber or rubber-like material suitable for bonding to the skin of the aircraft. Such compounds are well known in the art and the selection of a particular compound will be predicated upon a number of factors which may include the nature of the aircraft skin to which the deicer is mounted, and the relative cost and availability of natural and synthetic rubbers. The parameters influencing a selection of bonding ply material is well known in the rubber working art. Chloroprene such as Neoprene ® (duPont) and nitrile rubbers are preferred as bonding ply materials The inflatable member 24 is a tube like structure typically running the length of the deicer and like the intermediate plies 14, 16 formed of a fabric material coated on one surface with a rubberizing compound. The tube 24 is formed whereby the surface coated with the rubberizing compound faces outwardly from the center of the inflatable member 24 and therefore defines an inflation cavity 28 within the tubular member 24. An inflation conduit 30 is provided in fluid communication with the inflation cavity 28 in suitable or conventional well known manner. An interstitial conduit 31 is provided in fluid communication with the interstitial space 18 whereby the interstitial space 18 may be evacuated employing a source of vacuum.

Only a single inflation member 24 is shown in FIG. 1 and should be understood that a plurality of inflation members may be positioned under the outer skin 12 and configured for inducing distortion of the outer skin upon inflation. The inflatable member 24 is of a size and shape such that when inflated to a desired pressure, typically between about 69 and about 276 kPa, the outer skin is deformed above the tubular member to an extent of not more than about 0.5 centimeters and preferably not more than approximately 0.25 centimeters. The actual distortion required is a function of the physical configuration of the leading edge 10 and the nature of ice deposits formed thereon. Typically such distortions are desirable in a range of between 0.1 and 0.35 centimeters. Distortion of the outer skin pursuant to inflation of the tubular member 24 produces a chord-wise strain depicted in FIG. 1 by lines 35 in the outer skin 12 and this distortion and accompanying chord-wise strain distorts to the point developing stresses at the ice/skin interface which serve to break the adhesive bond of the ice to the skin, and developing cohesive fractures in the ice itself due, it is believed, to an inability of the ice to strain to the extent of the strain in the skin to which the ice is attached.

The entire deicer 10 is bonded to the aircraft skin in suitable or conventional well known manner, but typically employing an adhesive such as 3M part number 1300L.

Step-off filets 37, 38 are provided to assure uniform smooth profile for the deicer 10.

The chord-wise strain depicted by the lines 35 induces a certain very limited stretching motion in the deicer outer skin 12. Stretching in the outer skin 12 is limited because, unlike conventional pneumatic deicers, the outer skin is possessed of a high modulus of elasticity. High modulus considerations are not important with respect to the rubberized intermediate plies 14, 16, and the bonding ply 26 which are intended to be substantially low modulus. Modulus considerations are important only for the outer skin 12 which is intended to be substantially high modulus. Accordingly, the outer skin is formed of a substantially high modulus material having an ultimate elongation greater than about 3.0% and most preferably greater than about 5.0% By elastic what is meant is capable of sustaining deformation without permanent loss of size or shape. The operational elongation to which the outer skin 12 is subjected during distortion as a result of chord-wise strain should be less than the ultimate elongation inherent in the outer skin 12 material forming the outer surface of the deicer otherwise premature failure of the outer skin 12 may occur. The operational elongation should also be less than the fatigue strain for the material. Fatigue strain is the elongation to which frequent distortion produces material fatigue failure.

The outer skin 12 may be formed from suitable or conventional materials such as metals or plastics. Thin sheets of annealed stainless steel and thin sheets of annealed titanium are useful in the practice of the invention as an outer skin 12. By thin what is meant is 0.00254 to about 0.0254 centimeters for metals and 0.008 centimeters to 0.0508 for non metals Likewise, plastics having the characteristic of a high modulus of elasticity and a suitable ultimate elongation find utility in forming an outer skin. One plastic material finding particular use in the practice of the invention is polyetheretherketone (Peek) available from ICI. Other suitable or conventional plastic material such as polycarbonates, acetals, nylons, polyesters, polyvinyl fluorides, polyethylenes and the like can be employed in the practice of the instant invention. Such materials will possess an ultimate elongation greater than about 3.0% and preferably greater than about 5.0% and an elastic modulus or Youngs modulus of at least about 40,000 kPa and preferably at least about 275,000 kPa but up to about 7,500,000 kPa or more. The use of polymeric materials over metals may be advantageous due to a lower tendency for ice to adhere to such polymeric materials.

It should be apparent, referring to FIG. 1, that alternate means for deforming the surface layer 12 can be employed other than an inflatable tubular member 24. The inflatable member 24 can be replaced by a bar activated employing a mechanical lifter to deform the surface layer 12. Such mechanical lifter can be activated employing a cam like device, or a fluid activation system such as a conventional hydraulic lifter mechanism.

Figure 5:
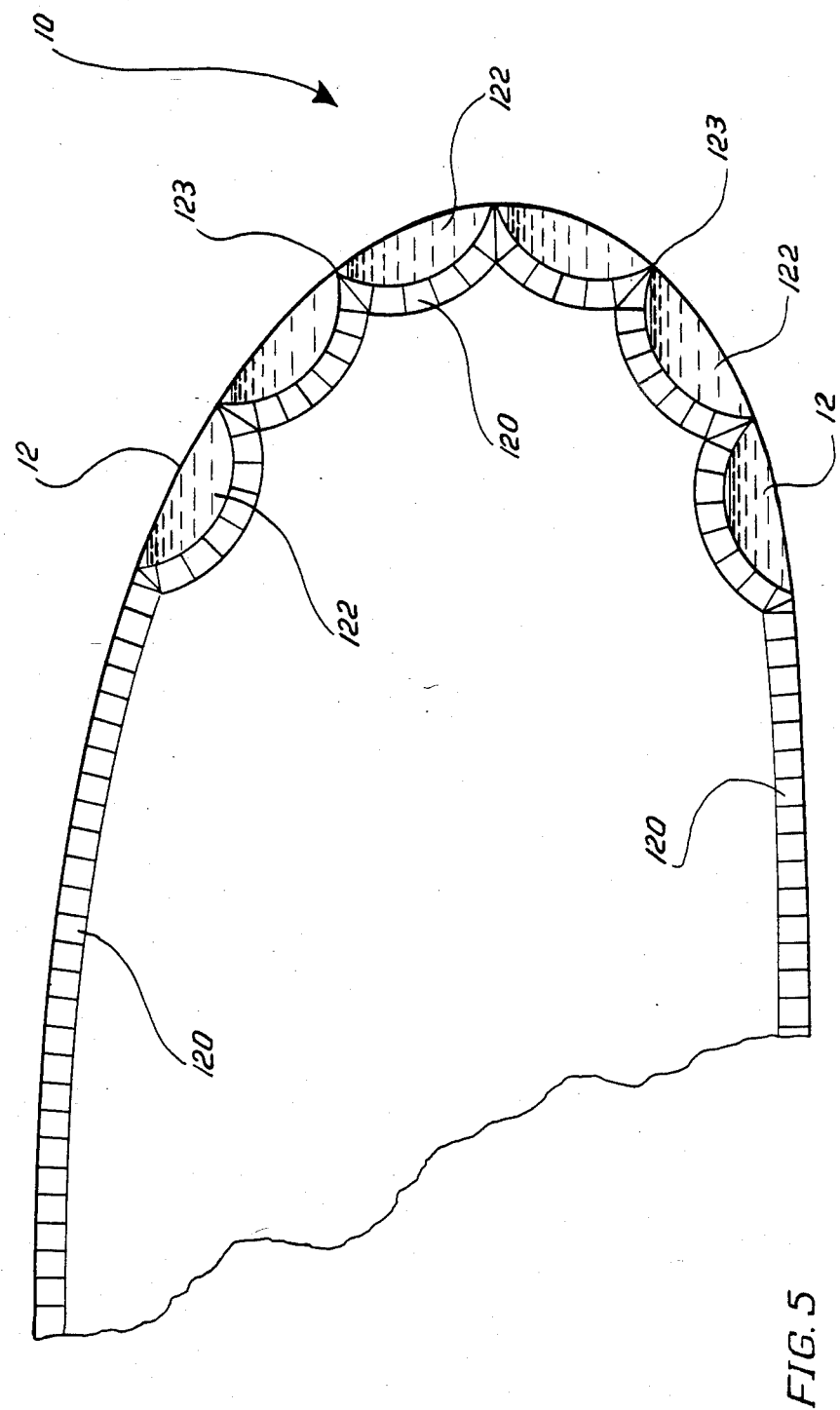
FIG. 5 is a section view of an alternate embodiment of a deicer in accordance with the invention.

Referring to FIG. 5, an alternate preferred embodiment of the invention is depicted of a deicer 10 having an outer skin 12 characterized by a substantial modulus of elasticity. The outer skin 12 is carried by a rigid wing structure 120 having formed therein a plurality of channels 122. The rigid wing structure 120 includes points of contact 123 configured for supporting the outer skin 12 against buckling as a result of air pressure encountered during functioning of the outer skin 12 as a leading edge for the wing structure 120.

The channels 122 are filled with a low density liquid resistant to freezing such as an alcohol. Periodically, the fluid within the channels 122 is subjected to compressive force which effectively inflates the channel 122 by deforming slightly the outer skin 12 in an outwardly direction. The pressure to which the low density fluid is subjected is then released and the deformation in the outer skin 12 is relaxed.

The rigid wing structure can be formed of any suitable or conventional material such as metal, or suitable or conventional reinforced composites. The outer skin can be of thin sheets of a annealed stainless steel or titanium or may be a plastic material such as Peek. The points of contact 123 may be finally drawn (point contacts or line contacts) as depicted in FIG. 5 or may form a broader plateau upon which the outer skin 12 may rest for support. The particular configuration of channels and points of contact will depend in part upon the material selected for construction of the rigid wing structure 120 and the outer skin 12. In lieu of introducing a sudden pressurization of the fluid contained within the channels 122, in an alternate embodiment a pulse of fluid pressure may be introduced to travel longitudinally along the channels 122 through the fluid. This pulse would have the effect of producing a momentary distortion in the outer skin 12 as the pulse passes. This momentary pulse could be generated by a simple plunger piston in connection with the channels 122 driven by a motorized excentric. Alternately, a timer driven solenoid admitting a pulse generated by a high volume mechanically driven pump could be employed to generate the pulse. The pulse must act in the same relatively time span of less than 0.5 seconds and preferably less than 100 miliseconds and most preferably less than about 50 milliseconds in order to produce a desired deicing effect employing a substantially high modulus or relative rigid outer skin 12 as shown in FIG. 5.

It is important that any such outer skin 12 deformation means function quickly. It is desirable that the outer skin 12 be deformed within about 0.250 seconds to assure effective ice removal of thicknesses of 0.6 centimeters or less, and as little as 0.05 centimeters in thickness. Thicknesses greater than 0.6 centimeters, though rarely encountered, are readily removed employing the deicer of the invention. Preferably the deformation occurs within about 100 milliseconds, and most preferably the deformation is completed substantially within about 50 milliseconds. This rapid deformation functions effectively to blast the ice off of the outer skin 12 without giving the ice accumulations an opportunity to conform substantially to the changing surface contour of the outer skin 12. Activation time significantly in excess of about 1.0 seconds can result in significant non-complete removal of ice from the outer skin 12. Non-complete removal can detrimentally effect performance of the component being deiced.

Where the distortion means is a mechanical device, rapid deformation is relatively readily accomplished such as by the use of a cam device or short stroke hydraulic actuators to press the outer skin 12 outwardly. Where the deicer 10 includes a tubular member 24 as shown in FIG. 1, inflation can be accomplished employing a fluid under pressure. Where the fluid is a liquid, a device having a capability for moving relatively substantial quantities of pressurizing fluid in a relatively short period of time is necessary to assure inflation within the desired time constraint. Where the inflation member 24 is inflated pneumatically, a pneumatic source under considerable pressure can be discharged into the deicer in a manner causing virtually instant inflation.

However, the introduction of fluid such as air under a substantially elevated pressure into the tubular member 24 without controls could result in over-inflation of the deicer and resultant damage to the leading edge structure. Accordingly, it is preferable that the deicer in accordance with the instant invention include a means for limiting or controlling the extent to which the outer skin is distorted.

For mechanical cams or hydraulic lifters, well known means for limiting travel may suffice. For liquid inflated tubular members 24 volume or pressure limiters may function desirably. For gaseous inflated tubular members 24, one such means is by accumulating the gaseous fluid under pressure in an accumulator of a physical size such that, upon discharge of the accumulator, a carefully determined quantity of air is released into the inflatable member just sufficient to produce a desired inflation and thereby desired degree of distortion and chord-wise strain in the outer skin 12.

Figure 4:
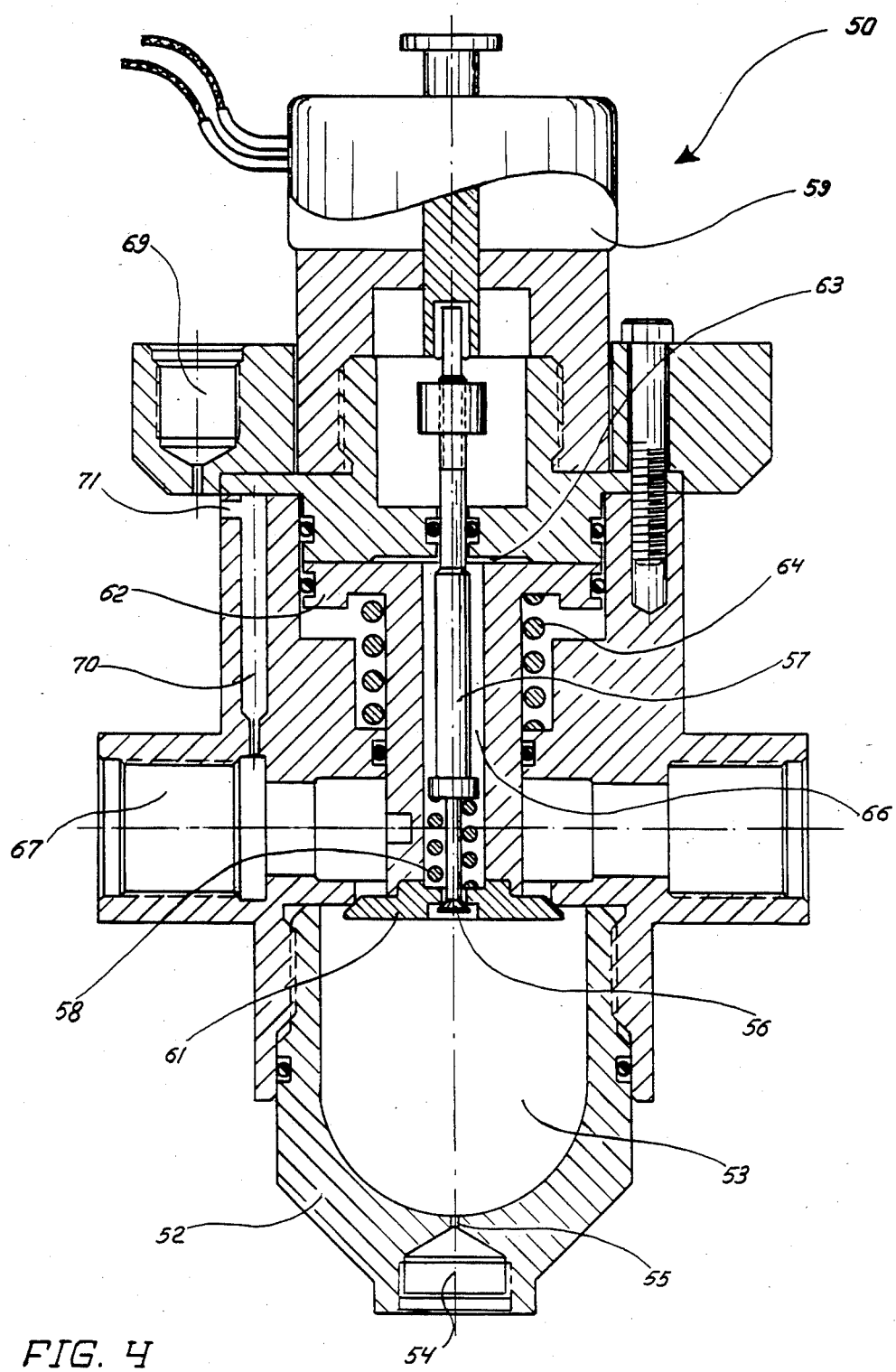
FIG. 4 is a side elevational view in partial cross section of an ejector/pilot operated discharge valve suitable for use in the practice of the instant invention.

Equally, a means or device for reliably insuring rapid and full discharge of any such accumulator into the deicer is desirable. Referring to the drawings, FIG. 4 depicts a pilot operated valve 50 including an accumulator 52 having an internal chamber 53 of a size configured for storing an appropriate quantity of air under under pressure for introduction into a tubular member 24 like that shown in FIG. 1. An inlet 54 is provided to the accumulator including an orifice 55 configured to build air pressure within the accumulator relatively slowly. A pilot seat 56 is provided opening into the chamber 53. The pilot seat 56 is mounted upon a shaft 57 which includes a spring biasing means 58. The shaft 57 is driven by an electrical solenoid 59. Upon activation of the solenoid, the pilot seat 56 is driven in a direction toward the accumulator cavity 53 thereby compressing the biasing spring 58. Upon release of the solenoid 59, the biasing spring 58 functions to return the pilot seat 56 to a closed position.

A main valve seat 61 is provided in a surrounding relationship to the pilot valve seat 56. The main valve seat is carried by a piston 62. A cavity 63 is present adjacent the piston 62 and the piston 62 is biasly driven by a biasing spring 64. An air bleed 66 joins the pilot valve seat 56 with the main valve piston cavity 63 whereby high pressure air from the cavity 53 may be applied to the cavity 63 by opening of the pilot valve seat 56.

The air pressure applied at 63 over a surface area of the piston 62 greater than the surface area of the valve seat 61 functions to drive the valve seat 61 open and allows a discharge of air contained within the accumulator cavity 53. Discharge from the cavity 53 is accomplished employing exit ports 67. As pressure in the accumulator cavity 53 drops, the biasing spring 64 functions to restore the main valve seat to a closed position.

The valve 50 includes an ejector 69 of suitable or conventional design and a vacuum passageway 70 in communication with at least one of the exit ports 67. The vacuum passageway 70 is in air transmitting communication between a bleed passage 71 and the ejector 69 whereby a vacuum may be drawn on the exit port 67. By applying a source of gas under relatively low pressure to the ejector 69 during those time periods when the pilot valve and main valve seats are closed, a vacuum may be drawn on the exit port, and thereby on the tubular inflation member 24 depicted in in FIG. 1. It may be desirable to configure the interstitial conduit 31 shown in FIG. 1 to be in fluid communication with the vacuum passageway 70 whereby air present in the interstitial conduit 31 and interstitial space 18 of FIG. 1 may be evacuated. Suitable or conventional well known conduit means may be employed for such interconnections.

The orifice 55 in FIG. 4 functions to prevent a rebuilding of pressure within the accumulator cavity 53 during discharge of the accumulated cavity 53 in a manner so rapid as to preclude the proper closing function of the valve seats 56, 61.

Figure 2:
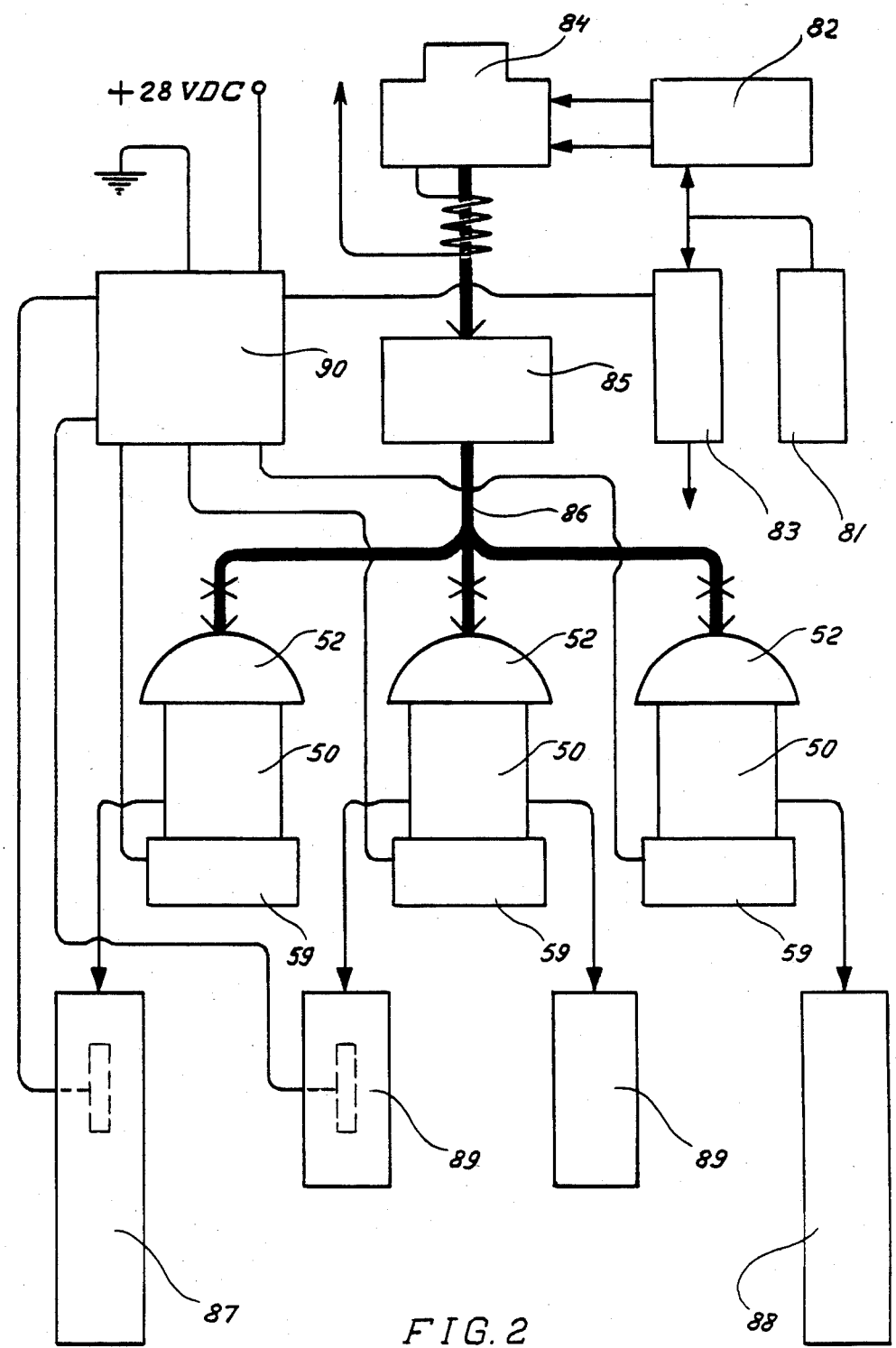
FIG. 2 is a control schematic for controlling activation of deicers in accordance with the instant invention.

Referring to the drawings, FIG. 2 depicts a schematic for a system 80 in accordance with the invention for deicing wings and horizontal stabilizers of an aircraft. The system 80 includes a source 81 of low pressure air such as a compressor or a bleed from a jet engine turbine stage. The source 81 is joined to regulators 82, 83 for assuring a constant supply pressure of the low pressure air source. The regulator 83 is configured to supply low pressure air to the ejector 69 depicted in FIG. 4.

The regulator 82 supplies a constant source of low pressure air to an intensifier 84 which boosts the pressure of the air arising from the low pressure source 81 to a desirably elevated pressure. An accumulator 85 is provided to receive the high pressure air. This accumulator 85 can be formed from suitable or conventional metal construction or may be formed employing a high strength fabric such as KEVLAR® available from duPont. By relatively low pressure what is meant is air at a supplied pressure of between about 7 and 700 kPa. By the term high pressure what is meant is a pressure of approximately 700 to about 12,000 kPa.

High pressure air in the main accumulator 85 is available through suitable conduits 86 to accumulators associated with pilot valves such as the accumulator 52 depicted in FIG. 4. Employing a pilot operated valve 50 such as is depicted in FIG. 4, the high pressure air from the accumulator is then made available to individual wing and stabilizer deicer 87, 88, 89 having inflatable members 24 such as are depicted in FIG. 1.

A control device 90 functions to control the activation of the solenoids 59 associated with the pilot operated valve 50 whereby timed release of high pressure air to the inflatable members 24 of the deicers 87, 88, 89 can be accomplished. Preferably, the control device 90 can, in part, also determine the timing and magnitude of the supply of air from the vacuum regulator 83 to ejector 69 associated with the pilot operated valves 50. Such control can be accomplished in well known fashion.

It should be understood that the system 80 depicted in FIG. 2 is exemplary only, and that various modifications and alterations may be made thereto in accommodating particular deicer and valving physical configurations. In particular, the low pressure source of air can be replaced by a high pressure source of air such as from a compressor or a storage gas bottle (not shown) whereupon the intensifier may become superfluous. Also, the vacuum regulator 83 and the regulator 82 may consist of a single unit supplying low pressure air for vacuum production and for intensification.

Figure 3:
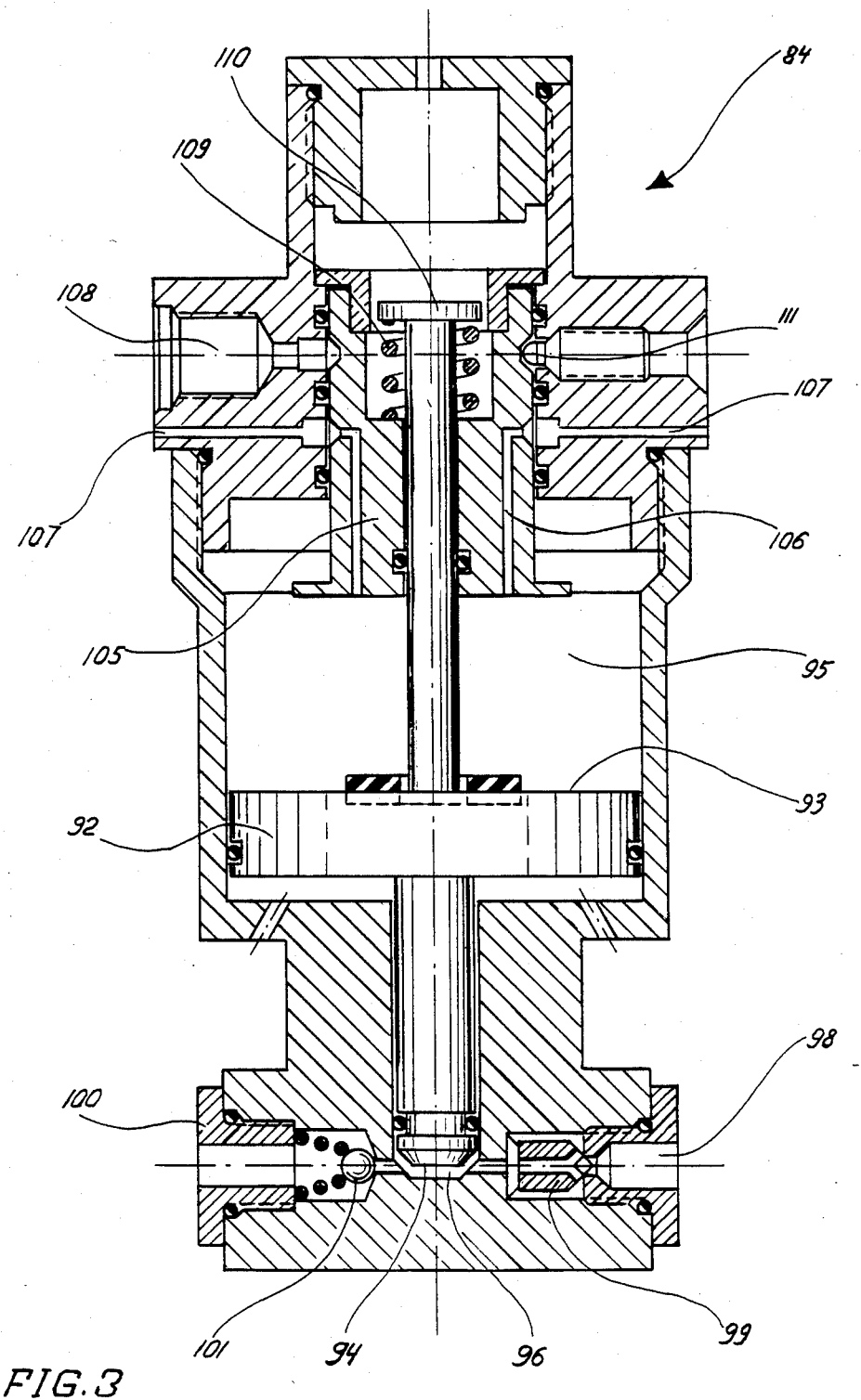
FIG. 3 is a side elevational view in cross section of a pneumatic intensifier suitable for use in the practice of the instant invention.

The intensifier 84 as depicted in FIG. 2 can be of a configuration such as is shown in FIG. 3. Referring to FIG. 3, an intensifier 84 includes a piston 92 having a large 93 and a small 94 surface and functioning within a large 95 and a small 96 piston cavity. An inlet 98 to the small cavity 96 includes an inlet check valve 99. An outlet 100 from the small cavity 96 includes an outlet check valve 101.

A shuttle poppet 105 is provided including a passageway 106. Movement of the shuttle poppet along an axis of the piston indexes the passageway 106 with a vent passageway 107 and a drive inlet 108.

A biasing spring 109 is provided for re-indexing the poppet 105. The biasing spring 109 is activated by a shaft portion 110 of the piston 92 which, during compressive motion of the piston, compresses the biasing spring 109 which exerts a force against the poppet 105 tending to return the poppet into alignment with the exhaust ports 107. A poppet position indexer 111 is provided to resist the effect of the biasing spring 109 until a desirably sufficient motion of the piston 92 has been accomplished.

In operation, low pressure air is supplied to the inlet 98 to fill the small piston cavity 96 and drive the piston until the large piston 93 encounters the poppet 105 and indexes the poppet 105 to align the passageways 106 with the drive inlet 108. Low pressure air is then applied to the large piston chamber 95 and drives the piston in a direction compressing gas present in the small piston chamber and causing the compressed gas to exit the outlet 100. With increasing compression action, the piston portion 110 compresses the bias spring 109 to a sufficient extent to overcome the retaining action of the indexer 111 and the passageway 106 is thereby again realigned at the exhaust ports 107 for recycle operation.

The intensifier 84 and the pilot valve 50 typically are made of lightweight material such as aluminum. Portions of the intensifier 84 such as the sealing surfaces and the pilot valve 50 may be formed of other machinable material such as lightweight plastics.

While a preferred embodiment has been shown and described in detail, it should be apparent that various modifications may be made thereto without departing from the scope of the claims that follow.

I claim:

1. A fluid pressure intensifier comprising: (i) an inlet for a low pressure supply of the fluid; (ii) a pair of piston chambers, one piston chamber being substantially larger than the other together with small and large piston surfaces associated therewith; (iii) conduit means for subjecting the smaller piston chamber to the supply of low pressure fluid; (iv) a shuttle poppet capable of shuttling between a first predetermined position and a second predetermined position, said poppet carrying conduit means in communication with the large piston chamber; (v) an indexer for the shuttle poppet; (vi) exhaust conduit means for communicating gaseous fluid from the large piston chamber to a point external to the intensifier, at least a portion of said exhaust conduit means being that conduit means carried by the shuttle poppet, and a second portion being carried otherwise upon the intensifier, the exhaust conduit portions being alignable into communication position by movement of the shuttle poppet to said first predetermined position; (vii) a second source of low pressure fluid configured to be alignable with the portion of the conduit means carried by the shuttle poppet upon movement of the shuttle poppet to said second predetermined position for introduction of low pressure fluid into the large piston chamber; (viii) an outlet; (ix) a conduit means in fluid transmitting relationship between the outlet and the small piston chamber; and (x) means for shuttling the shuttle poppet to and from the first and second predetermined positions in coordinated manner relative to the position of the piston.

2. A fluid pressure intensifier comprising: (i) a reciprocally actuatable piston having a large surface portion coacting with an associated large piston cavity joined in coaxially aligned opposed relationship to a small surface portion coacting with an associated small piston cavity; (ii) a first outlet, check valve and associated conduit means for subjecting the small surface portion and small cavity of the piston to a supply of low pressure fluid; (iii) a shuttle poppet reciprocally moveable coaxially with said piston, said poppet carrying conduit means in continuous communication with said large surface portion of the piston and its associated cavity; (iv) a first outlet, check valve and associated passageway for removal of high pressure fluid from the small surface portion and small cavity of the piston; (v) a second inlet for introduction of low pressure fluid into the large surface portion and associated large piston cavity; (vi) second outlet and exhaust conduit means for exhaustion of spent low pressure fluid from the large surface portion and associated large piston cavity; (vii) indexing means for alternately retaining the shuttle poppet in a first position in which the conduit means carried by the poppet is in communication with said second inlet and a second position in which the conduit means carried by the poppet is in communication with said second outlet exhaust conduit means; (viii) means for reciprocally moving the shuttle poppet between its said first position and its said second position in coordinated manner relative to the position of the piston to effect in alternating manner the introduction and exhaust of fluid from the large surface portion and associated piston cavity; the piston during fluid pressure intensification being driven away from the shuttle poppet by introduction of low pressure fluid into the large surface portion and associated piston cavity, the piston being driven toward the shuttle poppet by subjecting the small surface and small cavity of the piston to a supply of low pressure fluid while exhausting fluid from the large surface portion and associated large piston cavity.

* * * * *

UNITED STATES PATENT AND TRADEMARK OFFICE
CERTIFICATE OF CORRECTION

PATENT NO. : 4,807,515

DATED : February 28, 1989

INVENTOR(S) : JAMES C. PUTT

It is certified that error appears in the above-identified patent and that said Letters Patent is hereby corrected as shown below:

On Cover Sheet -

In (75) Inventors: "James A. Briscoe, James C. Putt, both of Doylestown; Ronald W. Phillips, II, Mogadore, all of Ohio"

should read -- James C. Putt, Doylestown, Ohio --

Column 11, line 18, "communication" should read --communicating--

Signed and Sealed this

Nineteenth Day of December, 1989

Attest:

JEFFREY M. SAMUELS

Attesting Officer     Acting Commissioner of Patents and Trademarks